No. 771,336. PATENTED OCT. 4, 1904.
J. THOMSON.
SCREW OR BOLT.
APPLICATION FILED OCT. 19, 1903.
NO MODEL.

Attest.
A. N. Jesbera
Myers W. Liddle

Inventor:
John Thomson
by Redding, Liddle & Greeley
Attys.

No. 771,336. Patented October 4, 1904.

UNITED STATES PATENT OFFICE.

JOHN THOMSON, OF NEW YORK, N. Y., ASSIGNOR TO NEPTUNE METER COMPANY, OF NEW YORK, N. Y., A CORPORATION OF NEW JERSEY.

SCREW OR BOLT.

SPECIFICATION forming part of Letters Patent No. 771,336, dated October 4, 1904.

Application filed October 19, 1903. Serial No. 177,623. (No model.)

*To all whom it may concern:*

Be it known that I, JOHN THOMSON, a citizen of the United States, residing in the borough of Manhattan, city of New York, in the county and State of New York, have invented certain new and useful Improvements in Screws or Bolts, of which the following is a specification.

This invention relates to screws and bolts; and its object is to provide a screw or bolt which upon the application of a predetermined stress will automatically withdraw itself from engagement with the nut or member into which it was primarily screwed without destroying the threads of either the bolt or the nut and without permanently unfitting the bolt for further use.

Figure 1:
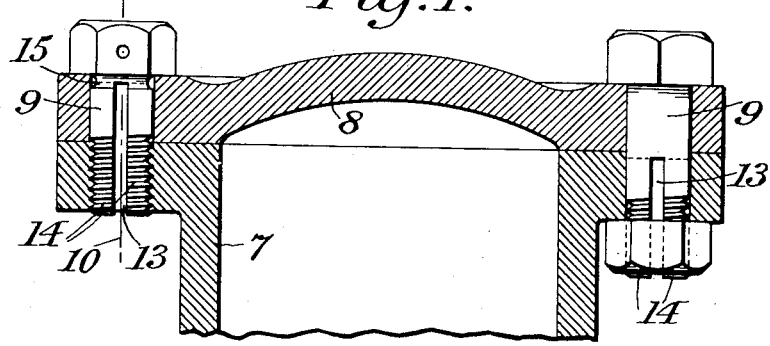
Figure 2:
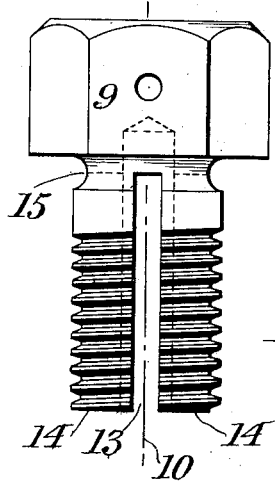
Figure 4:
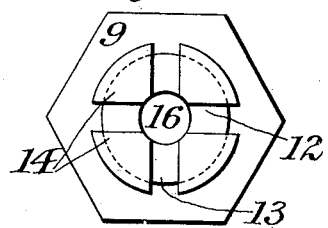
Figure 5:
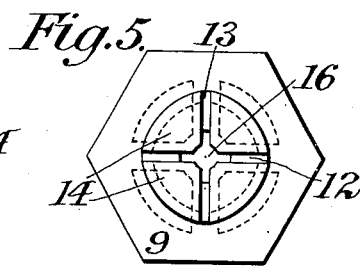
Figure 3:
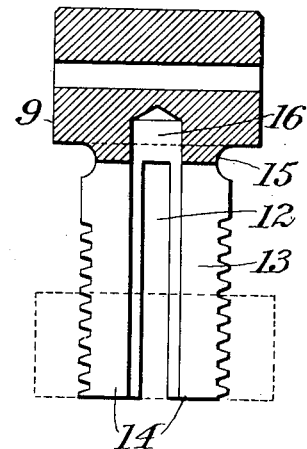

In the drawings forming a part hereof, Figure 1 denotes an embodiment of my invention as applied for securing a head to a cylinder. Fig. 2 is an enlarged elevation of a stud-bolt containing my invention. Fig. 3 is an enlarged vertical center section of a bolt as in Fig. 2 having a nut applied thereto. Fig. 4 is an end view of the bolt, showing it in its normal form; and Fig. 5 is also an end view of the bolt, but showing it in the form it is caused to take when automatically disengaged from the nut.

While this device may be employed to secure together any arrangement or kind of parts which are desired to separate under a predetermined load, I have here shown it as applied for binding a cylinder 7 to an inclosing-head 8, such as might be desired in the instance of a steam-engine, a pump, a water-meter, or the like, in which it is assumed that the head is to firmly withstand all normal strains, but will be forced off from the cylinder in the event of an excessive or dangerous load being applied, whatever may be the motive means. To effect the desired result just set forth, I form a threaded bolt or screw, as 9, in which the strain-resisting surface of the thread is formed to an angle of less than ninety degrees from the vertical axis 10 of the bolt. I then slot the end of the bolt, as at 12 13, completely separating it at one end lengthwise and forming a plurality of segmental prongs, as 14, whose upper ends are united to and are a part of the main body. This leaves upon the outer surfaces of the free ends of the prongs portions of the original thread, or, in other words, the bolt is now provided with a longitudinally-divided thread. Now when such a bolt is screwed into a nut or other member it will withstand such a strain as the resistance of the prongs will offer to the inward thrust due to the angle of the thread, and when this resistance is overcome the prongs will be sprung inwardly or collapsed or deflected, as see Fig. 5, to such an extent that the bolt will be forced out of engagement with the nut and the confined parts will be relieved from further strain. In the action just described the prongs of the bolt may take a permanent "set," in which instance they can again be driven out to their original position to be again used, or if material of sufficient resiliency is used they will automatically spring back when drawn free of the nut, and to facilitate such action I prefer to definitely weaken the bolt under the head by a groove, as 15, so that the flexure will be confined to this section and not take place at the threaded portion. The prongs may be readily weakened, so as to yield under any desired load, either by increasing the width or number of the slots or by drilling a hole, as 16, in the center of the bolt, or by forming the prongs of different lengths, as see Fig. 1. Again, the prongs may be made to collapse or deflect under a lesser or greater load by varying the angle of the thrust-resisting face of the thread with respect to the bolt's axis, which lies in the direction of the initial strain. Usually the ordinary V-thread of standard gage may be used, except that I prefer that it be somewhat flattened or rounded, as shown, at the root and at the apex.

The term "nut" is used in this specification and in the claims to refer to any part or member to which the screw or bolt is capable of being threaded, and it will be understood that an internally-threaded screw or bolt the prongs of which are adapted to be expanded outwardly to effect the disengagement from an externally-threaded member or nut is within the purview of my invention.

What I claim is—

1. The combination with a nut, of a screw or bolt, the thrust-resisting surface of its thread being less than an angle of ninety degrees from the axis, and whose threaded portion is split at least twice throughout its entire length to form a plurality of prongs, whereby, upon the application of sufficient axial strain, the prongs will be caused to spring inwardly, due to the thrust of the angle of the thread, thereby effecting an automatic disengagement from the nut into which it was primarily inserted.

2. The combination with a nut, of a screw or bolt whose main body is made up of segmental prongs provided with threads of V-shaped section, the prongs having sufficient free space between them as they rest within the nut for the purpose of automatically disengaging from the nut into which they may be inserted upon the application of sufficient axial stress to cause the prongs to be sprung inwardly by the angular thrust of the thread.

3. The combination with a nut, of a screw or bolt weakened in section under the head, by a groove, and having two vertical slots extending the entire length of the threaded portion and forming prongs, the peripheries of the prongs having threads of V-shaped section; as and for the purpose specified.

4. A screw or bolt weakened in section, by a groove, under the head, and also weakened in section by a central hole, and having a plurality of vertical slots, forming prongs; the peripheries of which have threads of V-shaped section; as and for the purpose specified.

5. The combination with a nut, of a screw having two vertical slots extending the entire length of the threaded portion and in which the surface of the thread is oblique to the axis, substantially as and for the purpose set forth.

6. The combination with a nut, of a screw having two radial slots extending the entire length of the threaded portion to form separate threaded prongs, substantially as and for the purpose set forth.

This specification signed and witnessed this 5th day of October, A. D. 1903.

JOHN THOMSON.

In presence of—
ALFRED W. KIDDLE,
A. N. JESBERA.